United States Patent
Cha et al.

(10) Patent No.: US 9,742,444 B1
(45) Date of Patent: Aug. 22, 2017

(54) BROADBAND DIGITAL TRANSMITTER USING π/4 PHASE OFFSET LOCAL OSCILLATOR (LO) SIGNALS

(71) Applicant: Avago Technologies General IP (Singapore) Pte. Ltd., Singapore (SG)

(72) Inventors: Choong Yul Cha, Irvine, CA (US); Hongrui Wang, San Diego, CA (US); Ravi Gupta, Sunnyvale, CA (US); Ali Afsahi, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/068,225

(22) Filed: Mar. 11, 2016

Related U.S. Application Data

(60) Provisional application No. 62/299,324, filed on Feb. 24, 2016.

(51) Int. Cl.
*H04L 27/00* (2006.01)
*H03C 3/00* (2006.01)
*H03D 3/00* (2006.01)
*H04B 1/04* (2006.01)

(52) U.S. Cl.
CPC .................................. *H04B 1/04* (2013.01)

(58) Field of Classification Search
USPC ........................ 375/219, 220, 221, 222, 240, 375/240.26–240.28, 259, 254, 285, 284, 375/278, 294, 295, 306, 307, 316, 320, 375/322, 302, 308, 298, 340, 346, 348, 375/339, 354, 371, 373, 376, 375, 296, 375/297, 326, 327
See application file for complete search history.

(56) References Cited

U.S. PATENT DOCUMENTS

| | | | | |
|---|---|---|---|---|
| 8,687,752 | B2* | 4/2014 | Park | H03L 7/091 375/354 |
| 2001/0030565 | A1* | 10/2001 | Ebuchi | G06F 1/06 327/258 |
| 2003/0200518 | A1* | 10/2003 | Saeki | G06F 1/06 327/149 |
| 2003/0227963 | A1* | 12/2003 | Dafesh | G01S 19/246 375/149 |
| 2006/0154639 | A1* | 7/2006 | Malone | H03D 7/165 455/324 |
| 2007/0127614 | A1* | 6/2007 | Kawakami | H03L 7/06 375/373 |

(Continued)

*Primary Examiner* — Linda Wong
(74) *Attorney, Agent, or Firm* — Sterne, Kessler, Goldstein & Fox P.L.L.C.

(57) ABSTRACT

A broadband digital transmitter is disclosed. The digital transmitter includes a vector decomposer circuit, a phase selector circuit, and a digital power amplifier (DPA). The vector decomposer circuit receives baseband in-phase (I) and quadrature (Q) signals and decomposes the baseband I and Q signals into an offset envelope signal and a non-offset envelope signal. The phase selector circuit receives a plurality of phase offset local oscillator (LO) signals and outputs, responsive to the baseband I and Q signals, offset LO signals and non-offset LO signals. The DPA processes the offset envelope signal, the non-offset envelope signal, the offset LO signals, and the non-offset LO signals to generate an output signal of the digital transmitter.

20 Claims, 10 Drawing Sheets

(56) References Cited

U.S. PATENT DOCUMENTS

| | | | |
|---|---|---|---|
| 2007/0147569 A1* | 6/2007 | Chang | H03L 7/07 |
| | | | 375/373 |
| 2009/0215417 A1* | 8/2009 | Fortuin | H03D 3/241 |
| | | | 455/208 |
| 2010/0002822 A1* | 1/2010 | Arima | H03L 7/0814 |
| | | | 375/371 |
| 2010/0176893 A1* | 7/2010 | Nose | H03K 5/13 |
| | | | 332/144 |
| 2011/0285471 A1* | 11/2011 | Vromans | H03F 1/0294 |
| | | | 332/103 |
| 2014/0126671 A1* | 5/2014 | Muhammad | H03C 1/00 |
| | | | 375/298 |
| 2015/0146818 A1* | 5/2015 | Kim | H04B 5/0031 |
| | | | 375/295 |
| 2015/0222464 A1* | 8/2015 | Liu | H04L 27/22 |
| | | | 375/327 |
| 2016/0295535 A1* | 10/2016 | Jose | H04L 7/0037 |

* cited by examiner

US 9,742,444 B1

BROADBAND DIGITAL TRANSMITTER USING π/4 PHASE OFFSET LOCAL OSCILLATOR (LO) SIGNALS

CROSS-REFERENCE TO RELATED APPLICATIONS

This application claims benefit of U.S. Provisional Application No. 62/299,324, filed Feb. 24, 2016, which is incorporated herein by reference in its entirety.

TECHNICAL FIELD

The present disclosure relates generally to digital power amplification and transmission.

BACKGROUND

Power saving and silicon area constraints have made component digitization a key goal in integrated circuits. In the area of radio frequency (RF) transmitters, conventional architectures, while becoming more digitized, continue to suffer from power efficiency degradation and reduced bandwidth.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

Figure 1:
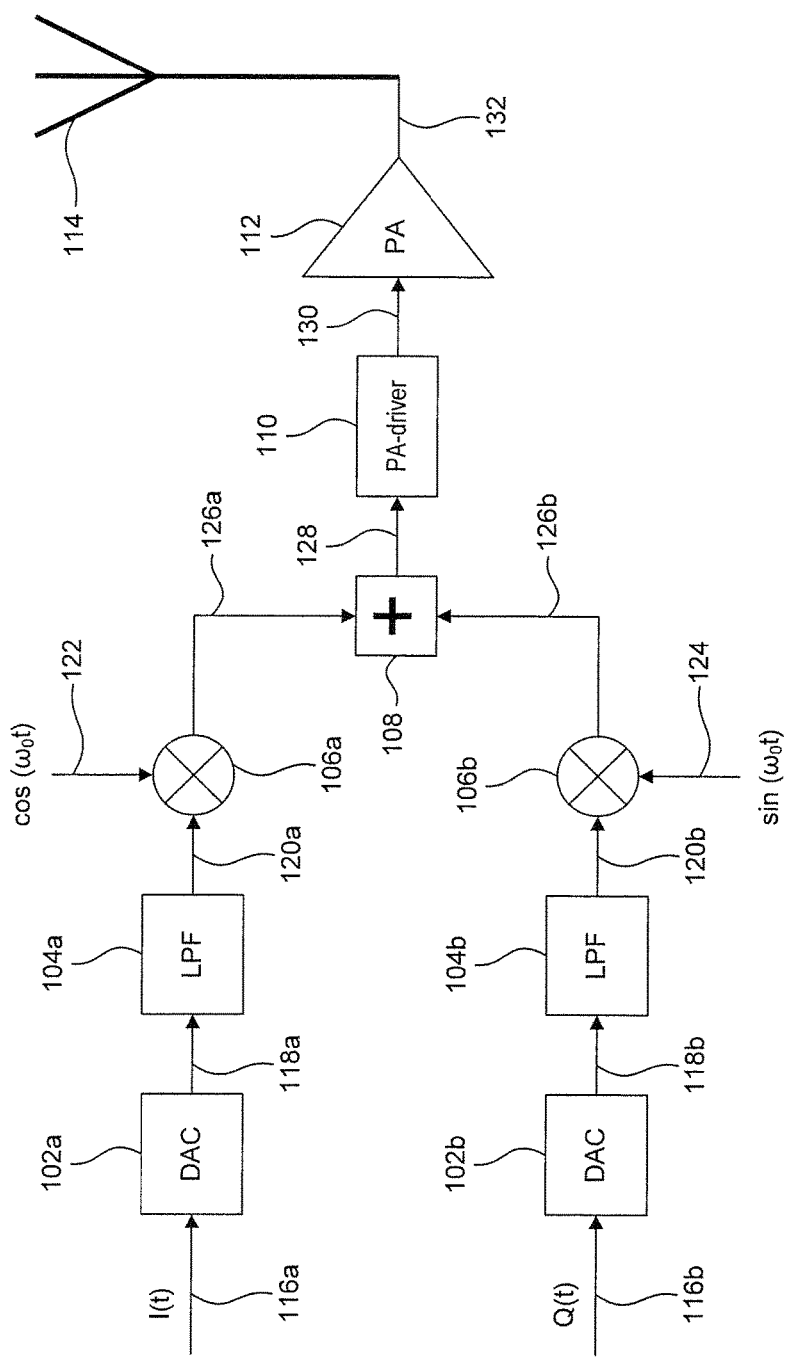
Figure 2:
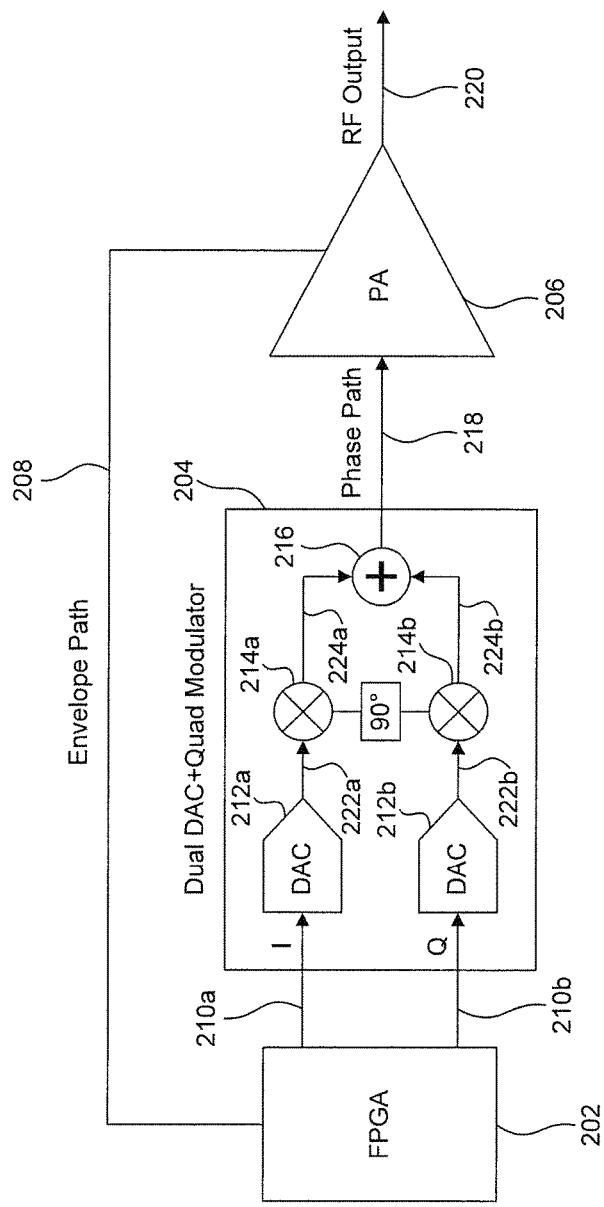
Figure 3:
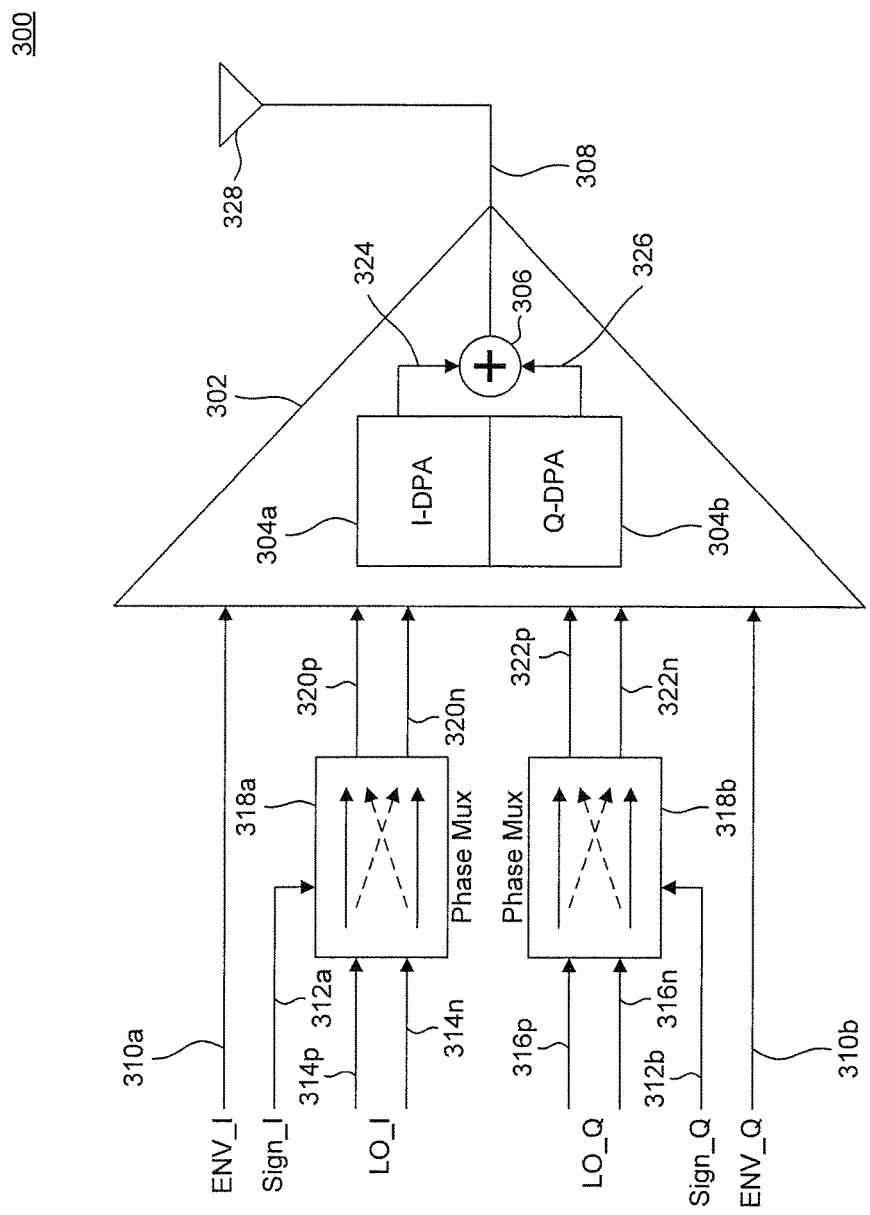
Figure 4:
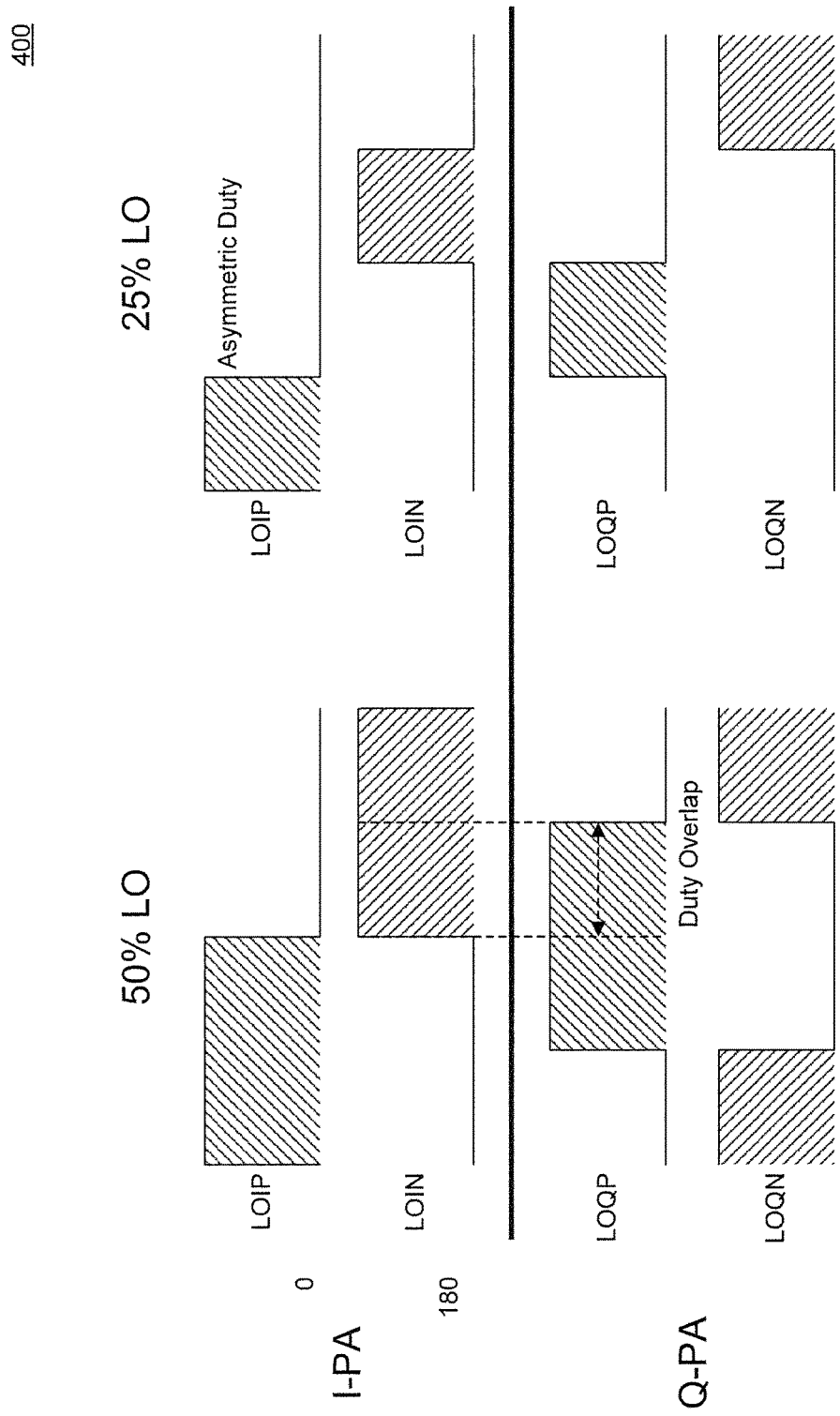
Figure 5:
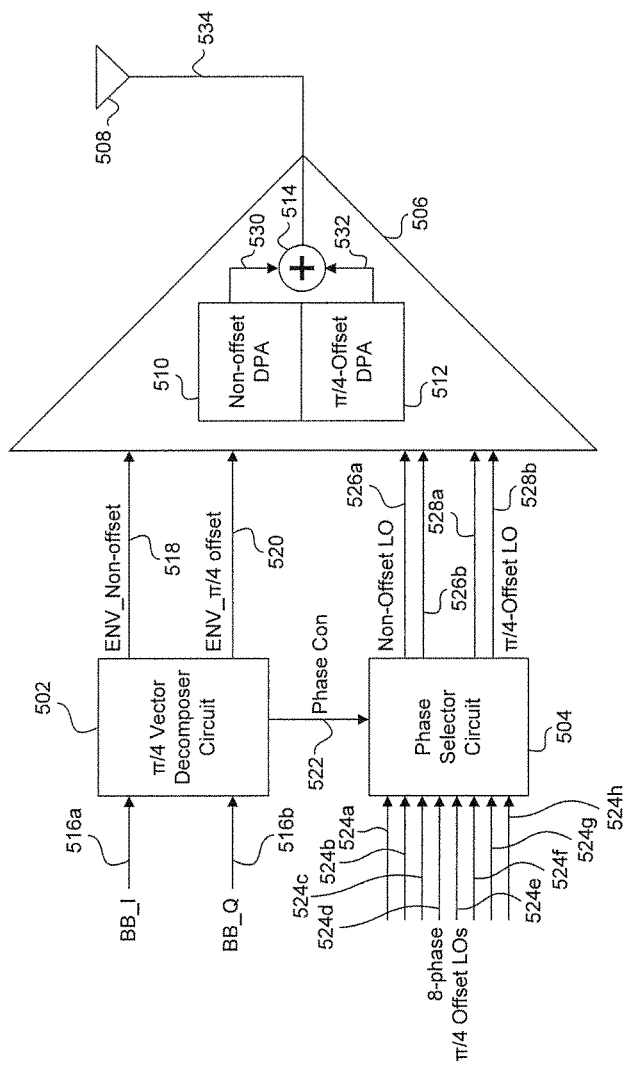
Figure 6:
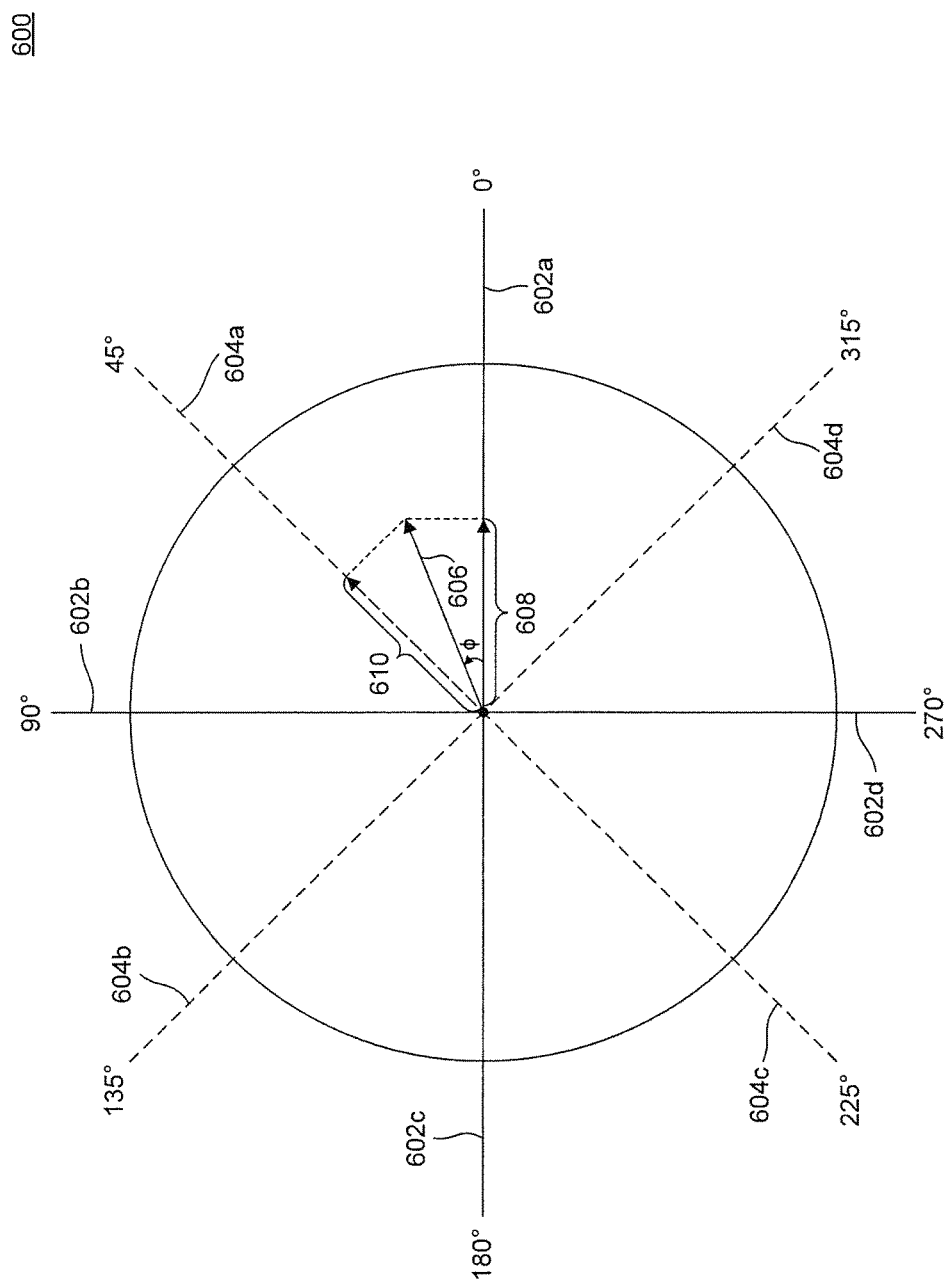
Figure 7:
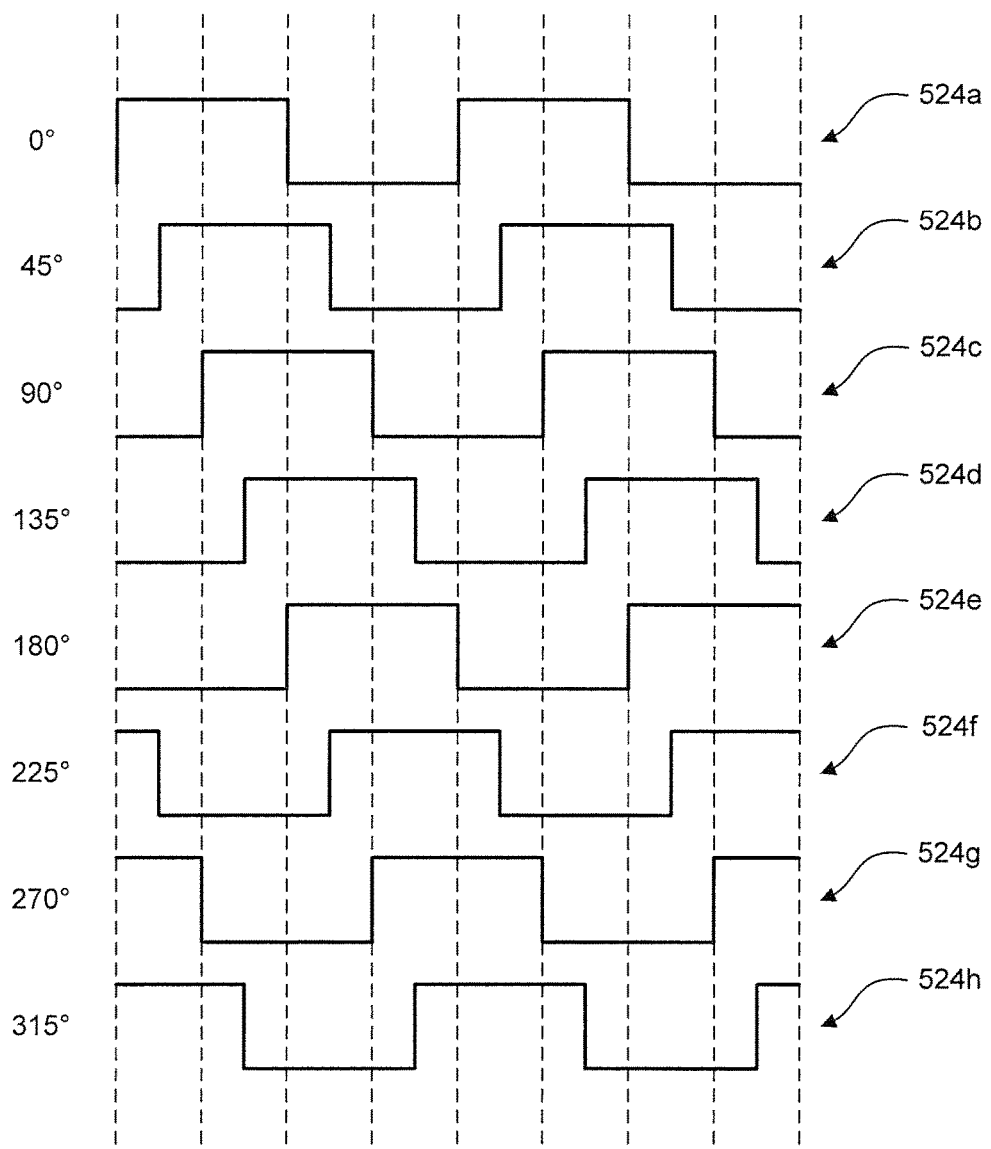
Figure 8:
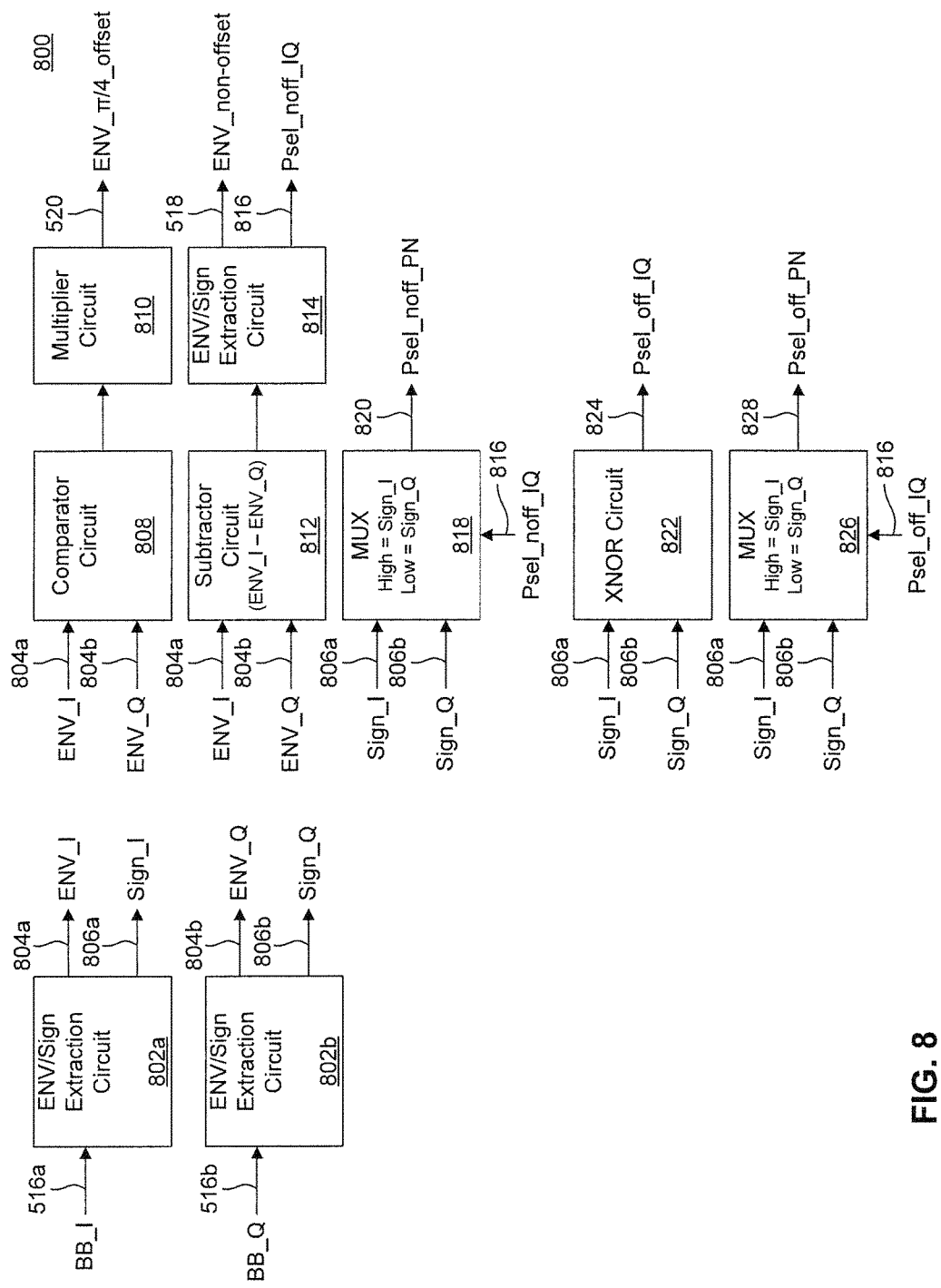
Figure 9:
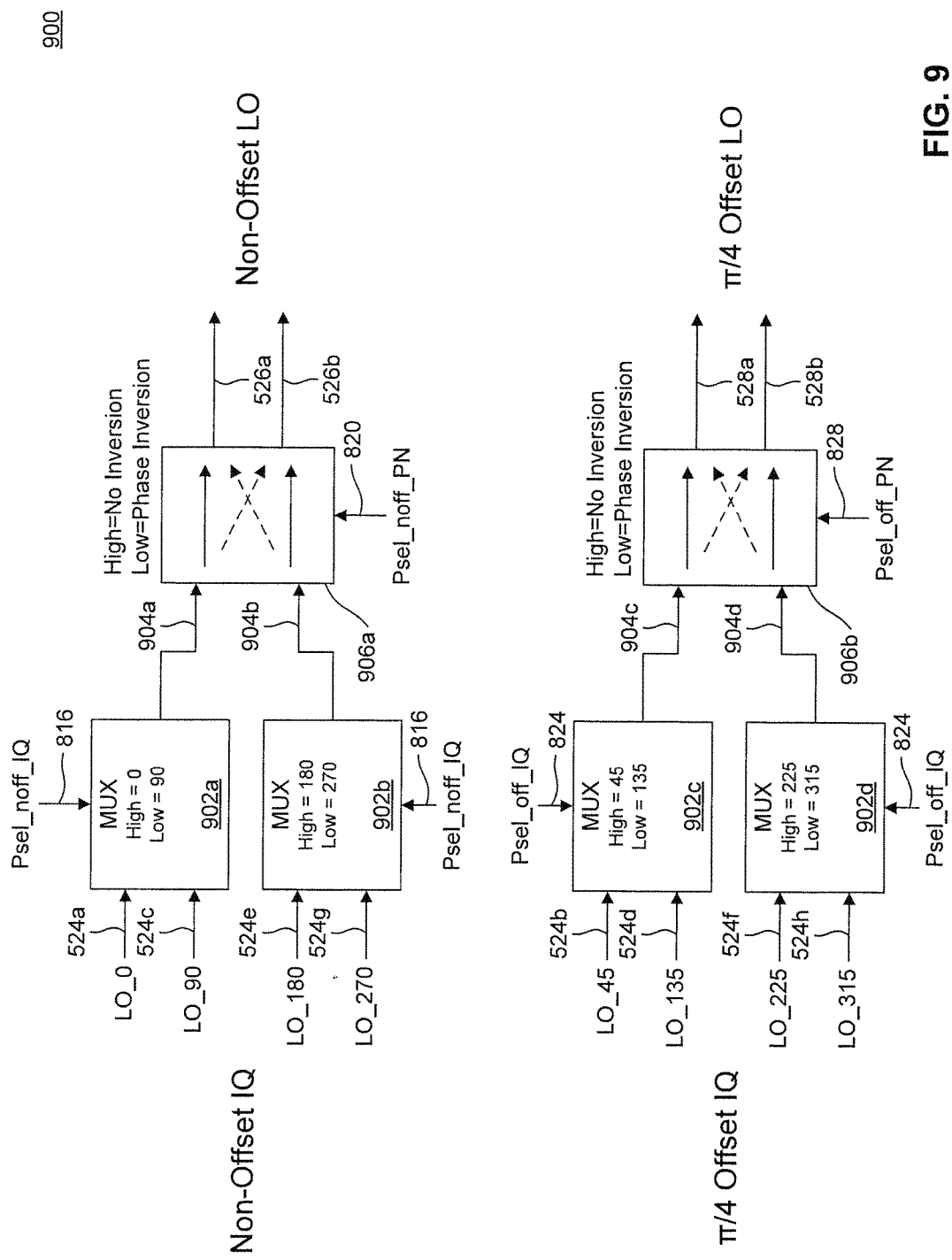
Figure 10:
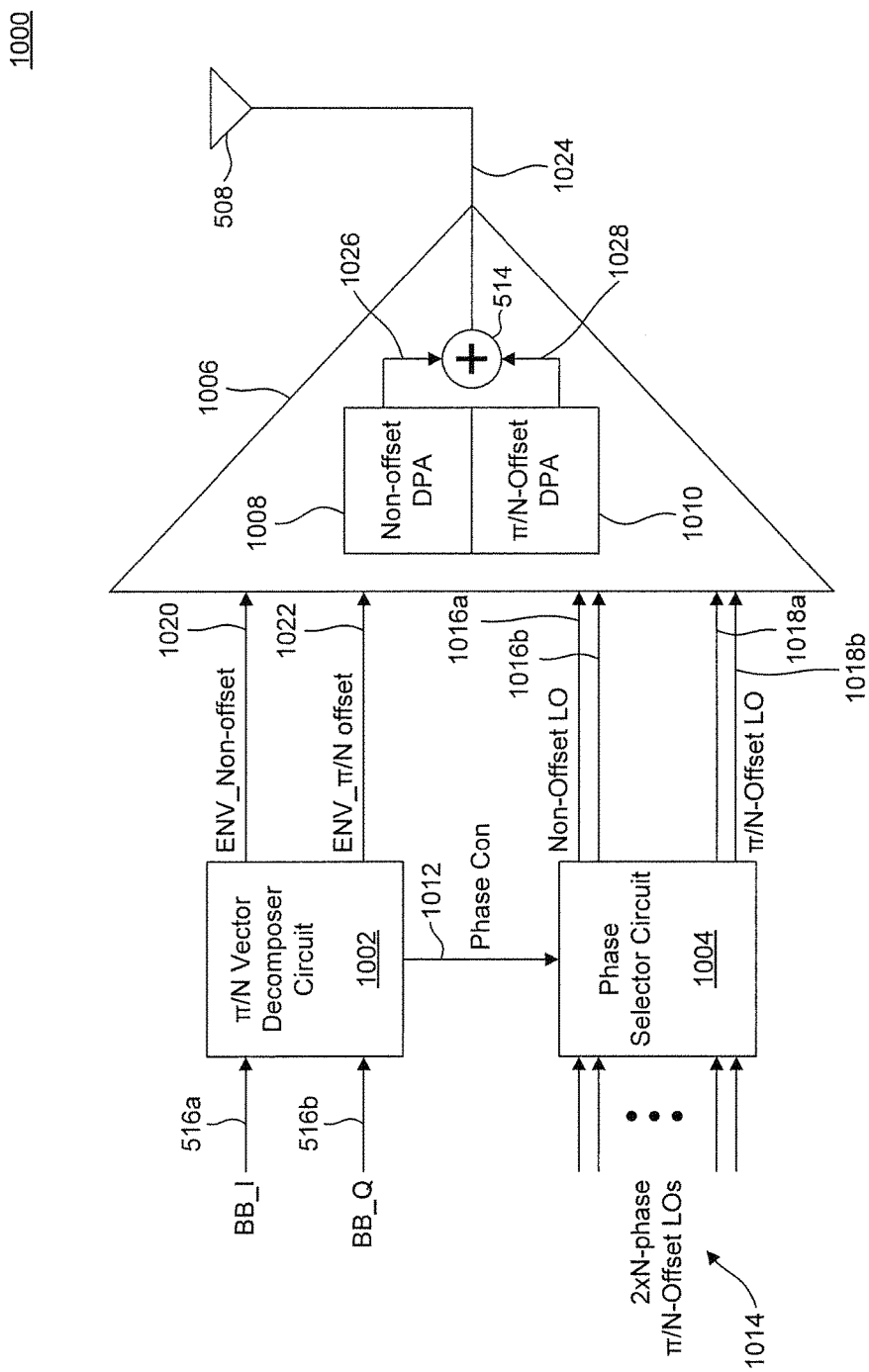

FIG. 1 illustrates an example analog Cartesian transmitter.
FIG. 2 illustrates an example hybrid polar transmitter.
FIG. 3 illustrates an example digital Cartesian transmitter.
FIG. 4 illustrates example local oscillator (LO) signals used in digital Cartesian transmitters.
FIG. 5 illustrates an example digital transmitter using π/4 phase offset LO signals.
FIG. 6 illustrates an example decomposition of a phasor into a phase offset component and a non-phase offset component.
FIG. 7 illustrates example 8-phase LO signals.
FIG. 8 illustrates an example vector decomposer circuit.
FIG. 9 illustrates an example phase selector circuit.
FIG. 10 illustrates an example digital transmitter using π/N phase offset LO signals.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

FIG. 1 illustrates an example analog Cartesian transmitter 100. Example analog Cartesian transmitter 100 is provided for the purpose of illustration only. As shown in FIG. 1, transmitter 100 includes digital-to-analog converters (DACs) 102a-b, low pass filters (LPFs) 104a-b, mixers 106a-b, a combiner 108, a power amplifier (PA) driver 110, and a PA 112.

Transmitter 100 is configured to receive digital baseband in-phase (I) and quadrature (Q) signals 116a and 116b via DACs 102a and 102b respectively. DACs 102a and 102b convert digital baseband I and Q signals 116a and 116b into analog baseband I and Q signals 118a and 118b respectively. LPFs 104a and 104b filter respectively analog baseband I and Q signals 118a and 118b to generate filtered analog signals 120a and 120b.

Filtered analog signals 120a and 120b are then mixed respectively in mixers 106a and 106b. Specifically, signal 120a is mixed with a first local oscillator (LO) signal 122 to generate a first frequency up-converted signal 126a, and signal 120b is mixed with a second LO signal 124 to generate a second frequency up-converted signal 126b. LO signals 122 and 124 share the same 90 degrees phase offset relationship as I and Q signals 116a and 116b. For example, LO signal 122 may include a $\cos(\omega t)$ wave and LO signal 124 may include a $\sin(\omega t)$ wave.

Signals 126a and 126b are then combined by combiner 108 to generate a signal 128. Optionally, signal 128 is amplified by PA driver 110 to generate a signal 130. PA 112 acts on signal 130 to generate an amplified output signal 132. Output signal 132 is forwarded to an antenna 114 for transmission.

Typically, DACs 102a-b, LPFs 104a-b, mixers 106a-b, combiner 108, PA driver 110, and PA 112 are all implemented using analog circuitry. As a result, transmitter 100 has several drawbacks, including higher power consumption and greater chip area. Transmitter 100 also may not benefit as much from technology process scale down since analog blocks are typically more difficult to shrink than digital blocks. In addition, the analog circuitry may have difficulty accommodating higher bandwidth waveforms, e.g., greater than 100 MHz.

FIG. 2 illustrates an example hybrid polar transmitter 200. Example hybrid polar transmitter 200 is provided for the purpose of illustration only. As shown in FIG. 2, transmitter 200 includes a Field Programmable Gate Array (FPGA) circuit 202, a phase modulator 204, and a PA 206. Phase modulator 204 includes DACs 212a-b, mixers 214a-b, and a combiner 216. In an embodiment, FPGA 202 is a digital circuit, PA 206 is a mixed signal circuit (like a DAC), while phase modulator 204 is implemented using analog circuitry.

FPGA 202 provides digital I and Q phase signals 210a and 210b to phase modulator 204 and an envelope signal 208 to PA 206. Typically, FPGA 202 performs a Cartesian to Polar transformation of Cartesian I and Q signals to generate I and Q phase signals 210a-b and envelope signal 208.

Phase modulator 204 processes I and Q phase signals 210a and 210b to produce a phase signal 218, which is provided to PA 206. Specifically, DACs 212a-b convert respectively digital I and Q phase signals 210a and 210b to generate analog I and Q phase signals 222a and 222b. Analog I and Q phase signals 222a and 222b are mixed with respective (90 degrees phase offset) LO signals in mixers 214a and 214b, respectively, to generate frequency up-converted analog I and Q phase signals 224a and 224b. Signals 224a and 224b are combined using combiner 216 to generate phase signal 218.

PA 206 processes envelope signal 208 and phase signal 218 to generate a radio frequency (RF) output signal 220. In an embodiment, PA 206 is a digital PA (DPA) that includes a plurality of RF DAC cells (not shown). Each of the plurality of RF DAC cells is configured to receive a digital version of phase signal 218 and to produce an analog output signal. Envelope signal 208 determines how many of the plurality of RF DAC cells are turned on at each instant of time, thereby amplitude modulating phase signal 218.

Despite implementing some circuitry digitally, transmitter 200 still requires a significant amount of analog circuitry. In addition, because Cartesian to Polar transformation increases signal bandwidth, higher bandwidth waveforms may be difficult to achieve in transmitter 200. In addition, transmitter 200 requires precise delay matching between the envelope signal and the phase signal. Significant transmission performance degradation can result due to delay mismatch between the envelope signal and the phase signal.

FIG. 3 illustrates an example digital Cartesian transmitter 300. Example digital Cartesian transmitter 300 is provided for the purpose of illustration only. As shown in FIG. 3, transmitter 300 includes a DPA 302 and phase multiplexers 318a-b. DPA 302 may include an in-phase DPA (I-DPA) 304a, a quadrature DPA (Q-DPA 304b), and a combiner 306. DPA 302 may be connected to an antenna 328. Transmitter 300 may be implemented entirely as digitized circuitry. As such, significant power consumption and area savings can be realized using transmitter 300.

A baseband processor (not shown) generates an I envelope signal 310a and a Sign_I signal 312a from a baseband I signal, and a Q envelope signal 310b and a Sign_Q signal 312b from a baseband Q signal. Sign_I signal 312a and Sign_Q signal 312b represent the respective polarities of the baseband I and Q signals. I envelope signal 310a and Q envelope signal 310b are provided to DPA 302, where the envelope signals represent the respective envelopes of the baseband I and Q signals.

Phase multiplexers 318a and 318b receive respectively (90 degrees phase offset) LO signals 314p-n and 316p-n. LO signals 314p-n and 316p-n are each differential signals (e.g., each composed of two 180 degrees phase shifted square waves). Phase multiplexer 318a outputs differential LO signal 320p-n at the control of Sign_I signal 312a. Specifically, when Sign_I signal 312a is a logic high, phase multiplexer 318a outputs differential input component 314p as differential output component 320p and differential input component 314n as differential output component 320n. Otherwise, when Sign_I signal 312a is a logic low, phase multiplexer 318a outputs differential input component 314p as differential output component 320n and differential input component 314n as differential output component 320p. The reversal of differential input components 314p and 314n when Sign_I signal 312a is low accounts for the negative polarity of the baseband I signal.

Phase multiplexer 318b acts in a similar manner on differential LO signal 316p-n, at the control of Sign_Q signal 312b, to generate differential LO signal 322p-n. Phase multiplexers 318a and 318b provide differential LO signals 320p-n and 322p-n to DPA 302.

In an embodiment, I-DPA 304a processes I envelope signal 310a and LO signal 320p-n to generate an output signal 324, and Q-DPA 304b processes Q envelope signal 310b and LO signal 322p-n to generate an output signal 326. Combiner 306 combines output signals 324 and 326 to generate an output signal 308 of transmitter 300. Output signal 308 is forwarded to antenna 328 for transmission.

In an embodiment, I-DPA 304a and Q-DPA 304b may each include a PA such as PA 206 described above with reference to FIG. 2. In another embodiment, each of I-DPA 304a and Q-DPA 304b includes a differential PA having a positive PA branch and a negative PA branch. The positive PA branch turns on when the positive component (e.g., 320p or 322p) of the LO signal is a logic high and turns off when the positive component of the LO signal is a logic low. The negative component (e.g., 320n or 322n) of the LO signal controls the negative PA branch similarly. Because the positive and negative components of the LO signal are differential (negatives of each other), only one of the positive and negative PA branches is on or off at any time.

Because combiner 306 combines output signals 324 and 326 directly (without isolation), I-DPA 304a and Q-DPA 304b are not supposed to turn on at the same time. This places constraints on the LO signals that may be used efficiently with transmitter 300. For example, 90 degrees phase offset 50% duty cycle LO signals, as illustrated in FIG. 4, may be inefficient to use in digital transmitter 300 as they can result in 25% overlap in a given duty cycle (when both I and Q are logic high), which reduces significantly the power efficiency and linearity of transmitter 300. Reducing the duty cycle to 25% eliminates any potential duty cycle overlap between I-DPA 304a and Q-DPA 304b. But the asymmetric 25% duty cycle results in a strong second harmonic frequency component in the LO signals (when either I or Q is a logic high), which reduces significantly the power efficiency and linearity of transmitter 300.

A solution, as further described below in FIGS. 5-10, includes reducing the duty cycle overlap by utilizing a greater number of symmetric LO signals with a smaller phase offset between them. For example, instead of using four 90 degrees phase offset LO signals as shown in FIG. 4, eight 45 degrees phase offset LO signals (or more than eight with even lower phase offset) may be used. This reduces the potential duty cycle overlap by at least 50%. At the same time, high power efficiency can be ensured by the use of symmetric LO signals.

FIG. 5 illustrates an example digital transmitter 500 according to an embodiment of the present disclosure. Example digital transmitter 500 is provided for the purpose of illustration only. As shown in FIG. 5, digital transmitter 500 includes a π/4 vector decomposer circuit 502, a phase selector circuit 504, and a DPA 506. Digital transmitter 500 may be connected to an antenna 508.

π/4 vector decomposer circuit 502 is configured to receive baseband in-phase (I) and quadrature (Q) signals 516a and 516b. In an embodiment, I and Q signals 516a and 516b are generated by a baseband processor (not shown) based on an information modulated complex waveform containing desired information to be transmitted. I and Q signals 516a and 516b include a representation of an instantaneous magnitude and an instantaneous phase of the complex waveform.

π/4 vector decomposer circuit 502 is configured to decompose I and Q signals 516a and 516b into a non-offset envelope signal 518 and an offset envelope signal 520. In an embodiment, non-offset envelope signal 518 corresponds to a non-offset component of the instantaneous magnitude of the complex waveform, obtained by projecting a phasor representation of the complex waveform onto a selected non-offset axis (e.g., 0, 90, 180, and 270 degrees). Offset envelope signal 520 corresponds to an offset component of the instantaneous magnitude of the complex waveform, obtained by projecting the phasor representation of the complex waveform onto a selected offset axis. The selected offset axis and non-offset axis depend on the magnitudes and polarities (signs) of I and Q signals 516a and 516b.

FIG. 6 illustrates an example decomposition 600 of a phasor 606 into an offset component 610 and a non-offset component 608 according to an embodiment. Phasor 606 may represent a time instant of a complex waveform having a time-varying magnitude and phase. As such, the magnitude of phasor 606 represents the instantaneous magnitude of the complex waveform, and the phase angle (q) of phasor 606 relative to a reference axis (e.g., positive x axis) represents the instantaneous phase of the complex waveform. The vector space is divided into eight octants by four non-offset axes 602a, 602b, 602c, and 602d (e.g., 0, 90, 180, and 270 degrees, though other values may be used) and four offset axes 604a, 604b, 604c, and 604d (e.g., 45, 135, 225, and 315 degrees, though other values may be used). In other embodiments, the vector space may be divided into more than eight octants (e.g., 16, 32, or more angular portions).

As shown in FIG. 6, offset component 610 is obtained by projecting phasor 606 onto offset axis 604a (45 degrees axis). Offset component 610 may correspond to offset envelope signal 520, for example. Non-offset component 608 is obtained by projecting phasor 606 onto non-offset axis 602a (0 degrees axis). Non-offset component 608 may correspond to non-offset envelope signal 518, for example. The offset axis and the non-offset axis used depend on the phase angle ($\phi$) of phasor 606 (or the octant of the unit circle within which phasor 606 falls).

Returning to FIG. 5, $\pi/4$ vector decomposer circuit 502 provides non-offset envelope signal 518 and offset envelope signal 520 to DPA 506. Based on I and Q signals 516a and 516b, $\pi/4$ vector decomposer circuit 502 also generates a phase control signal 522. $\pi/4$ vector decomposer circuit 502 provides phase control signal 522 to phase selector circuit 504. As discussed further below with reference to FIG. 8, phase control signal 522 may include a plurality of control signals.

Phase selector circuit 504 is configured to receive a plurality of phase offset local oscillator (LO) signals 524a-h. In an embodiment, LO signals 524a-h provide 8-phase $\pi/4$ offset LO signals. For example, LO signals 524a-h may correspond to LO signals that are shifted by 0, 45, 90, 135, 180, 225, 270, and 315 degrees respectively relative to a reference LO signal. In an embodiment, LO signals 524a-h may be as shown by example 700 in FIG. 7.

In an embodiment, a first set of LO signals 524a-h represent non-offset LO signals (e.g., LO signals shifted by 0, 90, 180, and 270 degrees) and a second set of LO signals 524a-h represent offset LO signals (e.g., LO signals shifted by 45, 135, 225, and 315 degrees). Based on phase control signal 522, phase selector circuit 504 selects two of the first set of LO signals as non-offset LO output signals 526a and 526b and two of the second set of LO signals as offset LO output signals 528a and 528b.

Output signals 526a, 526b, 528a, and 528b of phase selector circuit 504 are provided to DPA 506. DPA 506 is configured to process non-offset envelope signal 518, offset envelope signal 520, non-offset LO signals 526a-b, and offset LO signals 528a-b to generate an output signal 534 of digital transmitter 500. In an embodiment, DPA 506 includes a non-offset DPA circuit 510, an offset DPA circuit 512, and a combiner circuit 514. Non-offset DPA circuit 510 is configured to process non-offset envelope signal 518 and non-offset LO signals 526a-b to generate a first signal 530. Offset DPA circuit 512 is configured to process offset envelope signal 520 and offset LO signals 528a-b to generate a second signal 532. Combiner circuit 514 is configured to combine first signal 530 and second signal 532 to generate output signal 534 of digital transmitter 500. Output signal 534 is forwarded to antenna 508 for transmission.

FIG. 8 illustrates an example vector decomposer circuit 800 according to an embodiment. Example vector decomposer circuit 800 is provided for the purpose of illustration only. Example vector decomposer circuit 800 may be an embodiment of $\pi/4$ vector decomposer circuit 502 described above with reference to FIG. 5. As shown in FIG. 8, vector decomposer circuit 800 may include a plurality of circuits, including circuits 802a-b, 808, 810, 812, 814, 818, 822, and 826.

Vector decomposer circuit 800 is configured to receive baseband I and Q signals 516a and 516b via envelope/sign extraction circuits 802a and 802b respectively. Circuit 802a is configured to generate an I envelope signal 804a and a Sign_I signal 806a based on baseband I signal 516a. Circuit 802b is configured to generate a Q envelope signal 804b and a Sign_Q signal 806b based on baseband Q signal 516b. I envelope signal 804a and Q envelope signal 804b represent respectively the magnitudes of baseband I and Q signals 516a and 516b. Sign_I signal 806a and Sign_Q signal 806b represent respectively the polarities of baseband I and Q signals 516a and 516b.

Circuitry 808, 810, 812, and 814 are configured to generate offset envelope signal 520 and non-offset envelope signal 518 from I envelope signal 804a and Q envelope signal 804b. Specifically, comparator circuit 808 is configured to determine the smaller signal between I envelope signal 804a and Q envelope signal 804b and to provide the result to circuit 810. Multiplier circuit 810 is configured to multiply the result by the square root of two to generate offset envelope signal 520. Subtractor circuit 812 is configured to generate a difference signal between I envelope signal 804a and Q envelope signal 804b and to provide the difference signal to circuitry 814. Envelope/sign extraction circuit 814 is configured to extract the envelope and signal of the difference signal to generate non-offset envelope signal 518 and a control signal 816 (Psel_noff_IQ).

Circuitry 818, 822, and 826 are configured to generate additional control signals 820, 824, and 828 based on Sign_I signal 806a and Sign_Q signal 806b. Specifically, circuitry 818 is configured to select between Sign_I signal 806a and Sign_Q signal 806b, responsive to control signal 816, to generate control signal 820 (Psel_noff_PN). In an embodiment, circuitry 818 outputs, as control signal 820, Sign_I signal 806a when control signal 816 is a logic high and Sign_Q signal 806b when control signal 816 is a logic low. In an embodiment, circuitry 818 may include a 2:1 multiplexer.

Circuitry 822 is configured to implement an XNOR logic function on Sign_I signal 806a and Sign_Q signal 806b to generate control signal 824 (Psel_off_IQ). Circuitry 826 is configured to select between Sign_I signal 806a and Sign_Q signal 806b, responsive to control signal 824, to generate control signal 828 (Psel_off_PN). In an embodiment, circuitry 826 outputs, as control signal 828, Sign_I signal 806a when control signal 824 is a logic high and Sign_Q signal 806b when control signal 824 is a logic low. In an embodiment, circuitry 826 may include a 2:1 multiplexer.

In an embodiment, control signals 816, 820, 824, and 828 are provided as control signal 522 to phase selector circuit 504. Together, control signals 816, 820, 824, and 828 enable phase selector circuit 504 to select appropriate LO signals from phase offset LO signals 524a-h depending on baseband I and Q signals 516a and 516b. Specifically, the selected LO signals, when mixed with non-offset envelope signal 518 and offset envelope signal 520 within DPA 506, result in a frequency modulated signal that includes the complex waveform represented by baseband I and Q signals 516a and 516b.

FIG. 9 illustrates an example phase selector circuit 900 according to an embodiment. Example phase selector circuit 900 is provided for the purpose of illustration only. Example phase selector circuit 900 may be an embodiment of phase selector circuit 504 described above with reference to FIG. 5. As shown in FIG. 9, phase selector circuit 900 may include multiplexers 902a-d and coupling circuits 906a-b.

Phase selector circuit 900 is configured to receive phase offset LO signals 524a-h and phase control signals 816, 820, 824, and 828. In an embodiment, LO signals 524a, 524c, 524e, and 524g, which represent non-offset LO signals (not offset in phase relative to traditional axes of a unit circle), are received by multiplexers 902a-b, and LO signals 524b, 524d, 524f, and 524h, which represent offset LO signals are received by multiplexers 902c-d.

At the control of control signal 816, multiplexers 902a and 902b select first and second non-offset LO signals 904a and 904b from LO signals 524a, 524c, 524e, and 524g. Specifically, when control signal 816 is a logic high, LO signals 904a and 904b correspond to LO signals 524a and 524e respectively (0 and 180 degrees). When control signal 816 is a logic low, LO signals 904a and 904b correspond to LO signals 524c and 524g respectively (90 and 270 degrees).

Multiplexers 902c and 902d select first and second offset LO signals 904c and 904d from LO signals 524b, 524d, 524f, and 524g based on control signal 824. Specifically, when control signal 824 is a logic high, LO signals 904c and 904d correspond to LO signals 524b and 524f respectively (45 and 225 degrees). When control signal 824 is a logic low, LO signals 904c and 904d correspond to LO signals 524d and 524h respectively (135 and 315 degrees).

Coupling circuits 906a-b are configured to couple the selected first and second non-offset LO signals 904a-b and the first and second offset LO signals 904c-d to output terminals of phase selector circuit 900 to generate non-offset LO output signals 526a-b and offset LO output signals 528a-b.

In an embodiment, coupling circuit 906a is configured to receive non-offset LO signals 904a-b and to couple non-offset LO signals 904a-b to non-offset LO output signals 526a-b responsive to control signal 820. In an embodiment, when control signal 820 is at a logic high level, coupling circuit 906a couples non-offset LO signal 904a to non-offset LO output signal 526a and non-offset LO signal 904b to non-offset LO output signal 526b.

Otherwise, when control signal 820 is at a logic low level, coupling circuit 906a swaps non-offset LO signals 904a and 904b such that non-offset LO signal 904a is coupled to non-offset LO output signal 526a and non-offset LO signal 904b is coupled to non-offset LO output signal 526b. The swapping of non-offset LO signals 904a and 904b results in a 180 degrees phase inversion (or otherwise a polarity reversal) in the signal resulting from mixing non-offset LO output signals 526a-b with non-offset envelope signal 518. In an embodiment, non-offset LO signals 904a and 904b are swapped when I envelope signal 804a is lower than Q envelope signal 804b and Sign_Q signal 806b is negative, or when I envelope signal 804a is greater than Q envelope signal 804b and Sign_I signal 806a is negative.

Coupling circuit 906b is configured to receive offset LO signals 904c-d and to couple offset LO signals 904c-d to offset LO output signals 528a-b responsive to control signal 828. In an embodiment, when control signal 828 is at a logic high level, coupling circuit 906b couples offset LO signal 904c to offset LO output signal 528a and offset LO signal 904d to offset LO output signal 528b.

Otherwise, when control signal 828 is at a logic low level, coupling circuit 906b swaps offset LO signals 904c and 904d such that offset LO signal 904c is coupled to offset LO output signal 528a and offset LO signal 904d is coupled to offset LO output signal 528b. The swapping of offset LO signals 904c and 904d results in a 180 degrees phase inversion (or otherwise a polarity reversal) in the signal resulting from mixing offset LO output signals 528a-b with offset envelope signal 520. In an embodiment, offset LO signals 904c and 904d are swapped whenever Sign_Q signal 806b is negative.

As would be understood by a person of skill in the art based on the teachings herein, embodiments are not limited to 764 vector decomposition of baseband I and Q signals 516a and 516b and can be extended generally to it/N vector decomposition, where N=8, 16, 32, etc, as illustrated by example digital transmitter 1000 of FIG. 10.

As shown in FIG. 10, example digital transmitter 1000 includes a π/N vector decomposer circuit 1002 that generates a non-offset envelope signal 1020 and an offset envelope signal 1022 based on a π/N vector decomposition of baseband I and Q signals 516a and 516b. π/N vector decomposer circuit 1002 also generates a phase control signal 1012 for a phase selector circuit 1004.

Phase selector circuit 1004 receives 2×N π/N phase offset LO signals 1014 and outputs first and second non-offset LO signals 1016a-b and first and second offset LO signals 1018a-b responsive to phase control signal 1012. DPA 1006 includes a non-offset DPA 1008 and a π/N offset DPA 1010. Non-offset DPA 1008 processes non-offset envelope signal 1020 and non-offset LO signals 1016a-b to generate output signal 1026. π/N offset DPA 1010 processes offset envelope signal 1022 and offset LO signals 1018a-b to generate output signal 1028. Output signals 1026 and 1028 of non-offset DPA 1008 and π/N offset DPA 1010 are combined using combiner 514 to generate an output signal 1024 of digital transmitter 1000.

For the purposes of this discussion, the term "processor circuitry" shall be understood to include one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal or external memory to retrieve instructions stored in the memory, which when executed by the processor, perform the corresponding function(s) associated with the processor.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A digital transmitter, comprising:
a vector decomposer circuit configured to receive baseband in-phase (I) and quadrature (Q) signals and to decompose the baseband I and Q signals into an offset envelope signal and a non-offset envelope signal;
a phase selector circuit configured to receive a plurality of phase offset local oscillator (LO) signals and to output, responsive to the baseband I and Q signals, first and second offset LO signals and first and second non-offset LO signals; and
a digital power amplifier (DPA) comprising:
an offset DPA circuit configured to generate a first signal based on the offset envelope signal and the first and second offset LO signals;
a non-offset DPA circuit configured to generate a second signal based on the non-offset envelope signal and the first and second non-offset LO signals; and
a combiner circuit configured to combine the first signal and the second signal to generate an output signal of the digital transmitter.

2. The digital transmitter of claim 1, wherein the vector decomposer circuit comprises:
first circuitry configured to generate an I envelope signal and a Q envelope signal based on the baseband I and Q signals respectively; and
second circuitry configured to generate the offset envelope signal and the non-offset envelope signal from the I envelope signal and the Q envelope signal.

3. The digital transmitter of claim 2, wherein the second circuitry is further configured to:
determine the smaller signal between the I envelope signal and the Q envelope signal; and
multiply the smaller signal by the square root of two to generate the offset envelope signal.

4. The digital transmitter of claim 2, wherein the second circuitry is further configured to:
generate a difference signal between the I envelope signal and the Q envelope signal; and
generate the non-offset envelope signal as an envelope of the difference signal.

5. The digital transmitter of claim 1, wherein the vector decomposer circuit is configured to generate a phase control signal based on the baseband I and Q signals.

6. The digital transmitter of claim 5, wherein the phase selector circuit is configured to output the first and second offset LO signals and first and second non-offset LO signals based on the phase control signal.

7. The digital transmitter of claim 6, wherein the plurality of phase offset LO signals include a first set of offset LO signals and a second set of non-offset LO signals, and wherein the phase selector circuit is further configured to:
select the first and second offset LO signals from the first set of offset LO signals based on a first control signal included in the phase control signal; and
select the first and second non-offset LO signals from the second set of non-offset LO signals based on a second control signal included the phase control signal.

8. The digital transmitter of claim 7, wherein the phase selector circuit is further configured to:
swap the first and second offset LO signals before outputting the first and second offset LO signals responsive to a third control signal, included in the phase control signal, having a first pre-determined logic level; and
swap the first and second non-offset LO signals before outputting the first and second non-offset LO signals responsive to a fourth control signal, included in the phase control signal, having a second pre-determined logic level.

9. A method for digital transmission, comprising:
receiving baseband in-phase (I) and quadrature (Q) signals;
decomposing the baseband I and Q signals into an offset envelope signal and a non-offset envelope signal;
selecting from a plurality of phase offset local oscillator (LO) signals, responsive to the baseband I and Q signals, first and second offset LO signals and first and second non-offset LO signals; and
generating an output signal using the offset envelope signal, the non-offset envelope signal, the first and second offset LO signals and the first and second non-offset LO signals,
wherein the first offset LO signal, the second offset LO signal, the first non-offset LO signal and the second non-offset LO signals all have different phases relative to each other.

10. The method of claim 9, wherein decomposing the baseband I and Q signals comprises:
generating an I envelope signal and a Q envelope signal based on the baseband I and Q signals respectively; and
generating the offset envelope signal and the non-offset envelope signal from the I envelope signal and the Q envelope signal.

11. The method of claim 10, wherein generating the offset envelope signal comprises:
determining the smaller signal between the I envelope signal and the Q envelope signal; and
multiplying the smaller signal by the square root of two to generate the offset envelope signal.

12. The method of claim 10, wherein generating the non-offset envelope signal comprises:
generating a difference signal between the I envelope signal and the Q envelope signal; and
generating the non-offset envelope signal as an envelope of the difference signal.

13. A method for digital transmission comprising:
receiving baseband in-phase (I) and quadrature (Q) signals;
generating a phase control signal based on the baseband I and Q signals;
decomposing the baseband I and O signals into an offset envelope signal and a non-offset envelope signal;
selecting from a plurality of phase offset local oscillator (LO) signals, based on the phase control signal, first and second offset LO signals and first and second non-offset LO signals; and
generating an output signal using the offset envelope signal, the non-offset envelope signal, the first and second offset LO signals and the first and second non-offset LO signals.

14. The method of claim 13, wherein the plurality of phase offset LO signals include a first set of offset LO signals and a second set of non-offset LO signals, and wherein selecting the first and second offset LO signals and the first and second non-offset LO signals further comprises:
selecting the first and second offset LO signals from the first set of offset LO signals based on a first control signal included in the phase control signal; and selecting the first and second non-offset LO signals from the second set of non-offset LO signals based on a second control signal included in the phase control signal.

15. The method of claim 14, wherein the plurality of phase offset LO signals include a first set of offset LO signals and a second set of non-offset LO signals, and wherein selecting the first and second offset LOs and first and second non-offset LOs further comprises:
selecting the first and second offset LO signals from the first set of offset LO signals based on a first control signal included in the phase control signal; and
selecting the first and second non-offset LO signals from the second set of non-offset LO signals based on a second control signal included the phase control signal.

16. The method of claim 9, further comprising:
generating a first signal based on the offset envelope signal and the first and second offset LO signals;
generating a second signal based on the non-offset envelope signal and the first and second non-offset LO signals; and
combining the first signal and the second signal to generate the output signal.

17. A digital transmitter, comprising:
a vector decomposer circuit configured to receive baseband in-phase (I) and quadrature (Q) signals, generate a phase control signal based on the baseband I and Q signals, and decompose the baseband I and Q signals into an offset envelope signal and a non-offset envelope signal;
a phase selector circuit configured to receive a plurality of phase offset local oscillator (LO) signals and to output, based on the phase control signal, first and second offset LO signals and first and second non-offset LO signals; and
a digital power amplifier (DPA) configured to generate an output signal of the digital transmitter using the offset envelope signal, the non-offset envelope signal, the first and second offset LO signals and the first and second non-offset LO signals.

18. The digital transmitter of claim 17, wherein the plurality of phase offset LO signals include a first set of offset LO signals and a second set of non-offset LO signals, and wherein the phase selector circuit is further configured to:
output the first and second offset LO signals from the first set of offset LO signals based on a first control signal included in the phase control signal; and
output the first and second non-offset LO signals from the second set of non-offset LO signals based on a second control signal included the phase control signal.

19. The digital transmitter of claim 18, wherein the phase selector circuit is further configured to:
swap the first and second offset LO signals responsive to a third control signal, included in the phase control signal, having a first pre-determined logic level; and
swap the first and second non-offset LO signals responsive to a fourth control signal, included in the phase control signal, having a second pre-determined logic level.

20. The digital transmitter of claim 17, wherein the first and second offset LO signals and the first and second non-offset LO signals all have different phases relative to each other.

* * * * *

UNITED STATES PATENT AND TRADEMARK OFFICE
CERTIFICATE OF CORRECTION

PATENT NO. : 9,742,444 B1
APPLICATION NO. : 15/068225
DATED : August 22, 2017
INVENTOR(S) : Cha et al.

Page 1 of 1

It is certified that error appears in the above-identified patent and that said Letters Patent is hereby corrected as shown below:

In Column 9, Line 63, Claim 7 replace "included the phase control signal" with --included in the phase control signal--.

In Column 10, Line 24, Claim 9 replace "non-offset LO signals" with --non-offset LO signal--.

In Column 11, Lines 5-15, Claim 15 replace "The method of claim 14, wherein the plurality of phase offset LO signals include a first set of offset LO signals and a second set of non-offset LO signals, and wherein selecting the first and second offset LOs and first and second non-offset LOs further comprises: selecting the first and second offset LO signals from the first set of offset LO signals based on a first control signal included in the phase control signal; and selecting the first and second non-offset LO signals from the second set of non-offset LO signals based on a second control signal included the phase control signal." with --The method of claim 14, wherein selecting the first and second offset LO signals and the first and second non-offset LO signals further comprises: swapping the first and second offset LO signals responsive to a third control signal, included in the phase control signal, having a first pre-determined logic level; and swapping the first and second non-offset LO signals responsive to a fourth control signal included in the phase control signal, having a second pre-determined logic level.--.

In Column 12, Line 19, Claim 19 replace "included the phase control signal" with --included in the phase control signal--.

Signed and Sealed this
Fifteenth Day of May, 2018

Andrei Iancu
*Director of the United States Patent and Trademark Office*